United States Patent [19]

Kniepmann et al.

[11] Patent Number: 5,402,352
[45] Date of Patent: Mar. 28, 1995

[54] PELLET MILL CONTROLLER WITH AUTOMATIC SETTING OF START VALUES

[75] Inventors: Mark R. Kniepmann, St. Louis; Christopher M. Nowakowski, Hazelwood, both of Mo.

[73] Assignee: Beta Raven, Inc., Earth City, Mo.

[21] Appl. No.: 20,764

[22] Filed: Feb. 22, 1993

[51] Int. Cl.⁶ ............................................. G06F 15/00
[52] U.S. Cl. .................... 364/468; 426/454; 425/143
[58] Field of Search ................ 364/468–473, 364/476, 477, 509, 510; 122/448.1; 425/144, 143, 145, 308, 331, 144; 426/454, 307; 99/487, 486; 264/40.6, 40.7; 366/145; 137/487, 624.11

[56] References Cited

U.S. PATENT DOCUMENTS

| | | | |
|---|---|---|---|
| 3,932,736 | 1/1976 | Zarow et al. | 99/487 |
| 4,277,832 | 7/1981 | Wong | 364/510 |
| 4,463,430 | 7/1984 | Volk, Jr. et al. | 364/468 |
| 4,671,757 | 6/1987 | Volk, Jr. | 425/144 |
| 4,678,424 | 7/1987 | Volk, Jr. et al. | 425/331 |
| 4,700,310 | 10/1987 | Volk, Jr. | 364/468 |
| 4,751,030 | 6/1988 | Volk, Jr. | 425/144 |
| 4,764,874 | 8/1988 | Volk, Jr. | 364/468 |
| 4,929,163 | 5/1990 | Volk, Jr. | 425/143 |
| 4,935,874 | 6/1990 | Volk, Jr. | 364/468 |
| 5,021,940 | 6/1991 | Cox et al. | 364/468 |

Primary Examiner—James P. Trammell
Attorney, Agent, or Firm—Rogers, Howell & Haferkamp

[57] ABSTRACT

An automatic control for a pellet mill includes a method for automatically calculating start values for feeder speed and steam valve position upon start-up of the pellet mill for pelleting particular formulas of feed. The method includes the step of monitoring the pellet mill to determine optimal feeder speed and steam valve position when the mill is running at optimal conditions, and then adjusting these values by a fixed percentage in order to determine the start-up values. As the steam valve is non-linear, another method is disclosed for converting the steam valve position to a corresponding steam flow, multiplying the optimal steam flow by the same fixed percentage, and then reconverting the starting steam flow value to a corresponding steam valve position. The fixed percentage used to determine the start values may be adjusted, depending upon how aggressive the operator desires the start-up to be and perhaps to adjust for differences in pellet formulations.

12 Claims, 7 Drawing Sheets

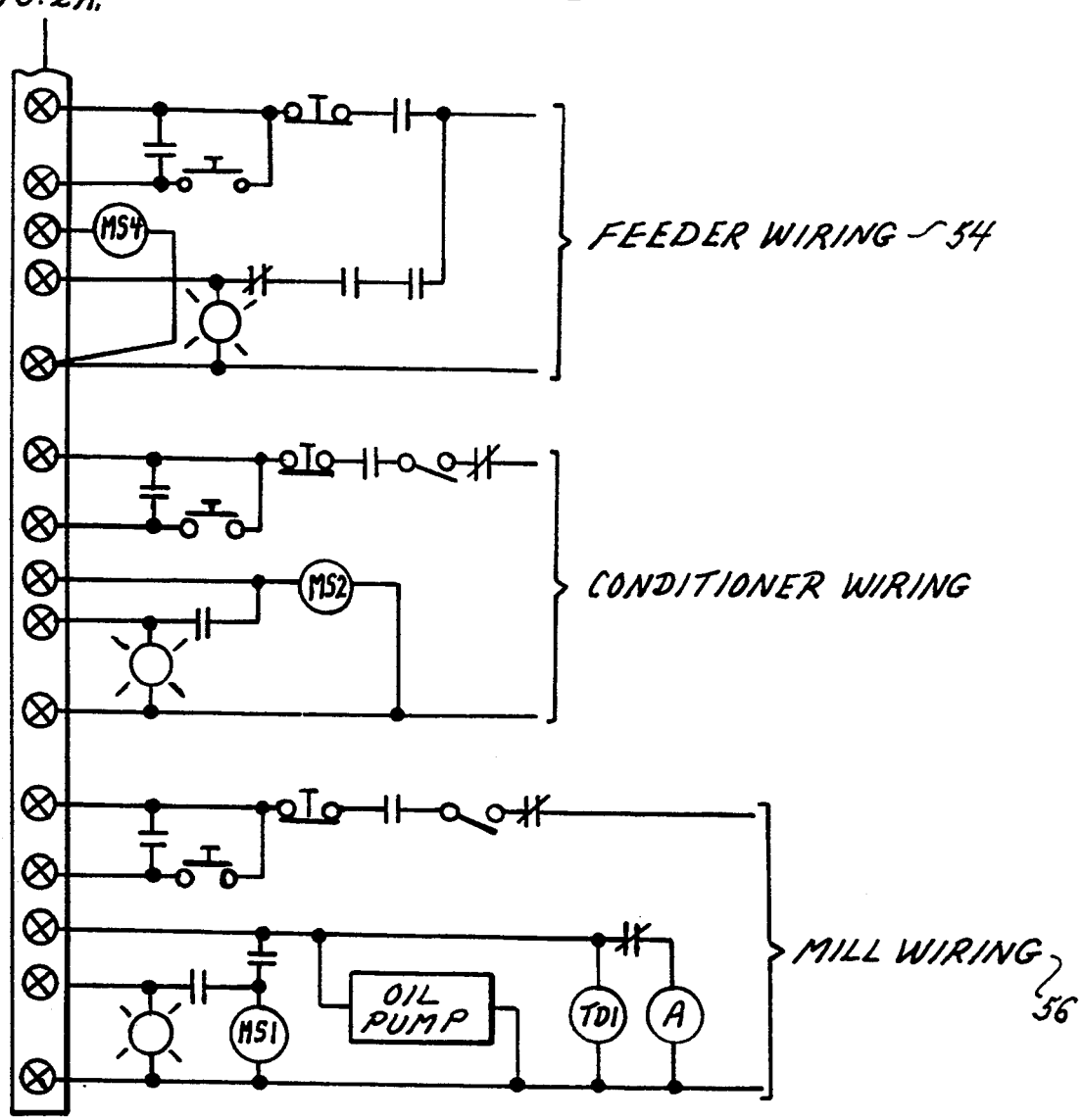

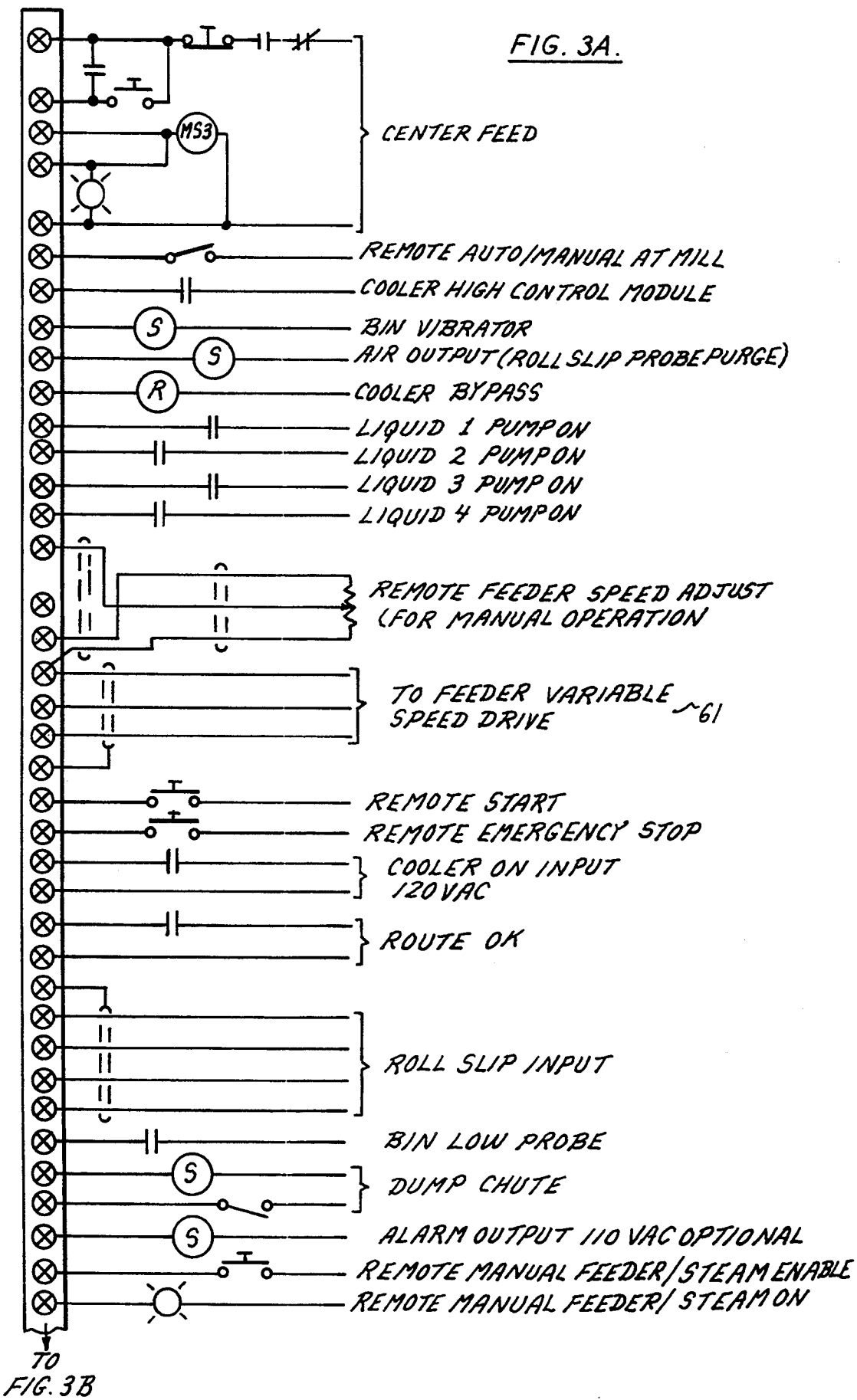

PELLET MILL CONTROLLER WITH AUTOMATIC SETTING OF START VALUES

BACKGROUND AND SUMMARY OF THE INVENTION

Over the past twenty years, controlling the operation of pellet mills has developed from an art to a science. The assignee of the present invention has been actively involved in this development and has patented many of its developments. These patents include U.S. Pat. No. 3,932,736, believed to be the first patent issued for an automatic pellet mill controller. Further developments have also been patented including U.S. Pat. No. 4,340,937; U.S. Pat. No. 4,463,430; U.S. Pat. No. 4,671,757; U.S. Pat. No. 4,678,424; U.S. Pat. No. 4,700,310; U.S. Pat. No. 4,725,958; U.S. Pat. No. 4,729,899; U.S. Pat. No. 4,742,463; U.S. Pat. No. 4,751,030; U.S. Pat. No. 4,764,874; U.S. Pat. No. 4,929,163; and U.S. Pat. No. 4,935,874, all of which are owned by the assignee herein. Virtually all, if not all, of these patents deal with controlling and operating the pellet mill after the pellet mill has been brought up to speed. Controlling the pellet mill during "run" conditions has been considered difficult enough without factoring in an attempt to automate the start-up process. This is perhaps because of the many variables which must be monitored and accounted for during the running of the pellet mill. For example, some formulations of feed are considered to be "hard starting" while other formulations are considered easier to start as there is less risk of plugging the mill on start up. As is well known to those in the art, the starting up of a pellet mill involves setting the steam and feed inputs at relatively low levels and then slowly increasing their values to approach optimum running speeds where the mill motor is running at a significant load and the product being produced, i.e. feed pellets, is of good quality. If the start points are too aggressive, or the inputs are ramped up too rapidly, there is a risk of clogging the pellet mill such that the pellet mill must then be shut down, cleaned out, and then restarted. Obviously, this results not only in a waste of time, but significant amounts of product may be wasted as well. Thus, plugs are sought to be avoided at all costs as they can be quite expensive to a mill operator.

For these reasons, in the prior art most pellet mill controllers are arbitrarily set with initial start points at twenty percent to thirty percent of run values or the like, and no particular attention is paid to maintaining any particular ratio between the feed input and the steam input. As is known in the art, feed is input to the pellet mill by way of a screw feeder wherein the feeder speed determines the rate of input of material. Steam is input through appropriate valves, including a steam modulating valve, and is measured in terms of a steam flow rate.

In order to solve these and other problems in the prior art, the inventors herein have succeeded in designing and developing a method for determining the initial set points or start points for starting a pelleting run in a pellet mill. In essence, the automatic pellet controller already is capable of monitoring the steam flow and rate of feed input by noting the modulating steam valve position and the feeder speed as the pellet mill runs at or near its optimum condition. Generally, an optimal mill run condition includes a mill motor operating at or near its rated horsepower capacity, a temperature parameter being satisfied, and with pellets being produced of good quality as measured by standards already established in the art. By making note of these optimum run conditions, appropriate start set points may be readily calculated by multiplying these run values by an appropriately determined fixed percentage thereof. Furthermore, this process of determining start set points may be repeated each time a run of a particular formula is made. Thus, the starting set points for a particular formula may change over time due to the changing operating conditions of the pellet mill caused by wear, etc., changes in ambient temperature, changes in feed consistency or quality, changes in steam consistency or quality, as well as any other changes experienced at the actual pellet mill installation. Thus, utilizing the feature of the present invention, a pellet mill controller will continuously update and adjust the starting points for the various formulations run through the pellet mill to fine tune and ensure a rapid, trouble-free start.

There are several ways contemplated by the inventors for "capturing" the steam valve position and feeder speed corresponding to the optimum run conditions. One way would be to continuously sample these values and use the last sampled values when optimum conditions were satisfied. Another way would be to periodically sample these values, and then average the sampled values corresponding to optimum run conditions. Or, the first set of values measured, or any other mathematical weighing, could be used to arrive at the optimum run values.

Still another advantage of the present invention is that the optimal ratio between steam and feed utilized during optimal run conditions may be determined and used to set the start points such that this ratio is present in the pellet mill from the beginning of the run. This also improves the starting and transition to run speeds. Because of the successful implementation of this invention, starting set points may be used which are dramatically higher than those typically utilized in the prior art. For example, as mentioned above, typical starting set points in the prior art ranged from twenty to thirty percent of run conditions. However, it has been found by the inventors herein in implementing the present invention that starting set points of eighty percent of run conditions are not uncommon. By utilizing these elevated start set points, the pellet mill is able to reach a final run condition much more rapidly and the product produced during the start-up phase is of much better quality and closer to that produced by the pellet mill in its full run mode. Thus, tremendous savings are realized not only in mill run time required to complete a typical run, but also wasted material is dramatically decreased.

In implementing this automated start-up methodology, the inventors have also addressed the problems induced in controlling the pellet mill with a modulating steam valve that is non-linear. In other words, with the kinds of ball valves generally used for modulating steam flow, there is a non-linear relationship between the opening of the ball valve and the amount of steam flow therethrough. For example, when the modulating steam valve is fifty percent open, the permitted steam flow therethrough is significantly less than fifty percent. Thus, the digital control of the modulating steam valve typically utilized in computerized automated pellet mill controllers, while effective in knowing what percentage the steam valve was open, was mistakenly using that percentage as corresponding to the same percentage of steam flow therethrough. In implementing the present invention, that difference became significant and the inventors herein have succeeded in implementing a methodology for eliminating that non-linear offset by determining the appropriate steam flow at run conditions, calculating an appropriate starting steam flow, and then converting that starting steam flow to a corresponding steam valve position. This inventive feature is also helpful in the actual control of the pellet mill itself in that, for the first time, actual steam flow through the steam valve may be determined by the controller and utilized instead of the steam valve position which did not correspond to steam flow in a linear fashion.

While the principal advantages and features of the present invention have been described above, a more complete and thorough understanding of the invention may be attained by referring to the drawings and description of the preferred embodiment which follow.

BRIEF DESCRIPTION OF THE DRAWINGS

FIGS. 2A-2B are schematic diagrams detailing the connections between the pellet mill controller and the pellet mill;

FIGS. 3A-3B are schematic diagrams which are continuations of FIGS. 2A-2B in detailing the connections between the pellet mill controller and the pellet mill;

DETAILED DESCRIPTION OF THE PREFERRED EMBODIMENT

Figure 1:
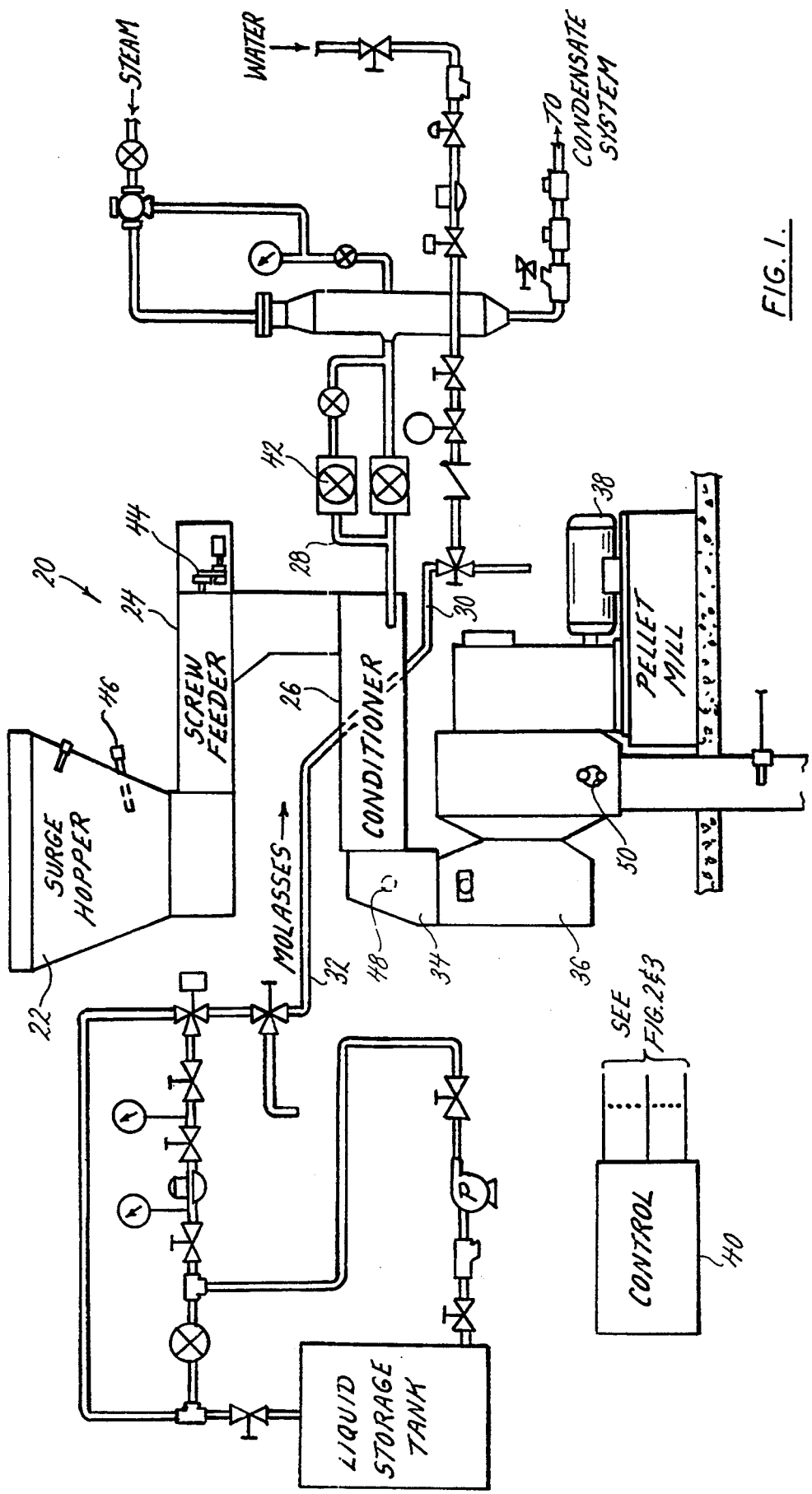
FIG. 1 is a schematic diagram of a typical pellet mill including the screw feeder and steam supply.

A typical pellet mill installation 20 is shown in FIG. 1, the details of which are well known to those of ordinary skill in the art as evidenced at least in part by the disclosures contained in the prior patents listed above. Generally, the pellet mill installation 20 includes a surge hopper or bin 22 for receiving the bulk dry material which is to be pelleted, a screw feeder 24 for metering out of the surge hopper 22 a controlled amount of feed, a conditioner 26 wherein the dry feed is conditioned through the addition of steam from steam line 28, water from water line 30, and molasses through molasses line 32, and a transition or spout 34 through which the conditioned feed passes into the pellet mill 36 itself, pellet mill 36 being driven by a drive motor 38. A controller 40 is also typically included and is connected to the various monitoring devices and control devices which control and monitor the input of ingredients into the pellet mill installation 20. These connections are detailed in FIGS. 2 and 3, and are well known to those of ordinary skill in the art.

For purposes of the present invention, it is important to note that a steam modulating valve 42 controls the flow of steam through steam pipe 28 into the conditioner 26. Additionally, a feeder motor 44 drives the screw feeder 24 to control the rate of input of dry material from the surge hopper 22. Additionally, mill motor 38 is monitored through the controller's monitoring of the load current thereof.

As disclosed in several of the assignee's prior patents listed above, various kinds of temperature control modes are utilized in controlling the operation of the pellet mill installation 20. In doing so, a number of temperature probes are utilized. As shown in FIG. 1, a bin temperature probe 46 is mounted in surge hopper 22, a spout temperature probe 48 is mounted in spout 34, and a pellet temperature probe 50 is mounted in the pellet mill 36 itself. Any one or more of these temperature probes may be used to determine the temperature parameter against which steam flow is controlled, as is explained more fully in the prior patents referenced above.

Figure 2A:
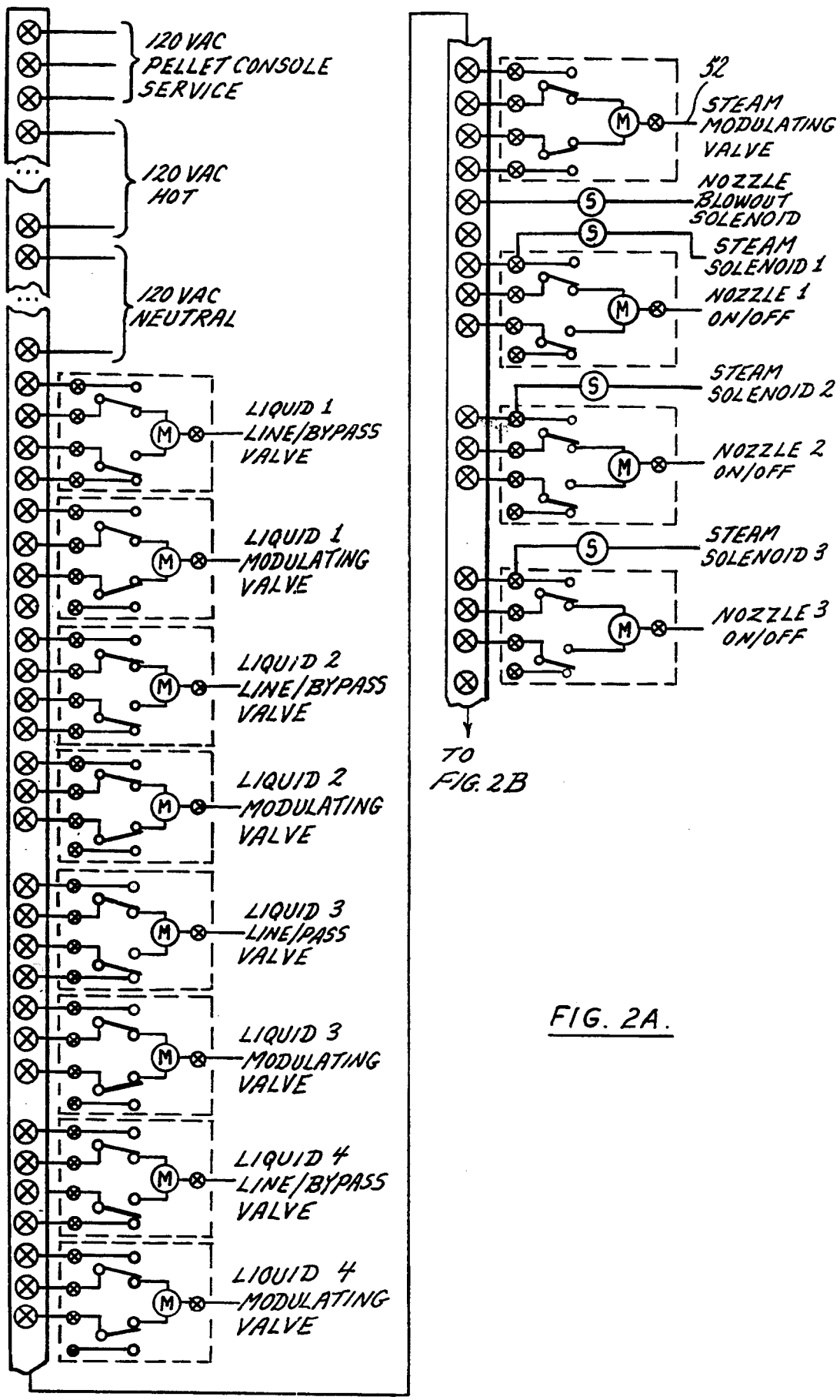
Figure 3B:
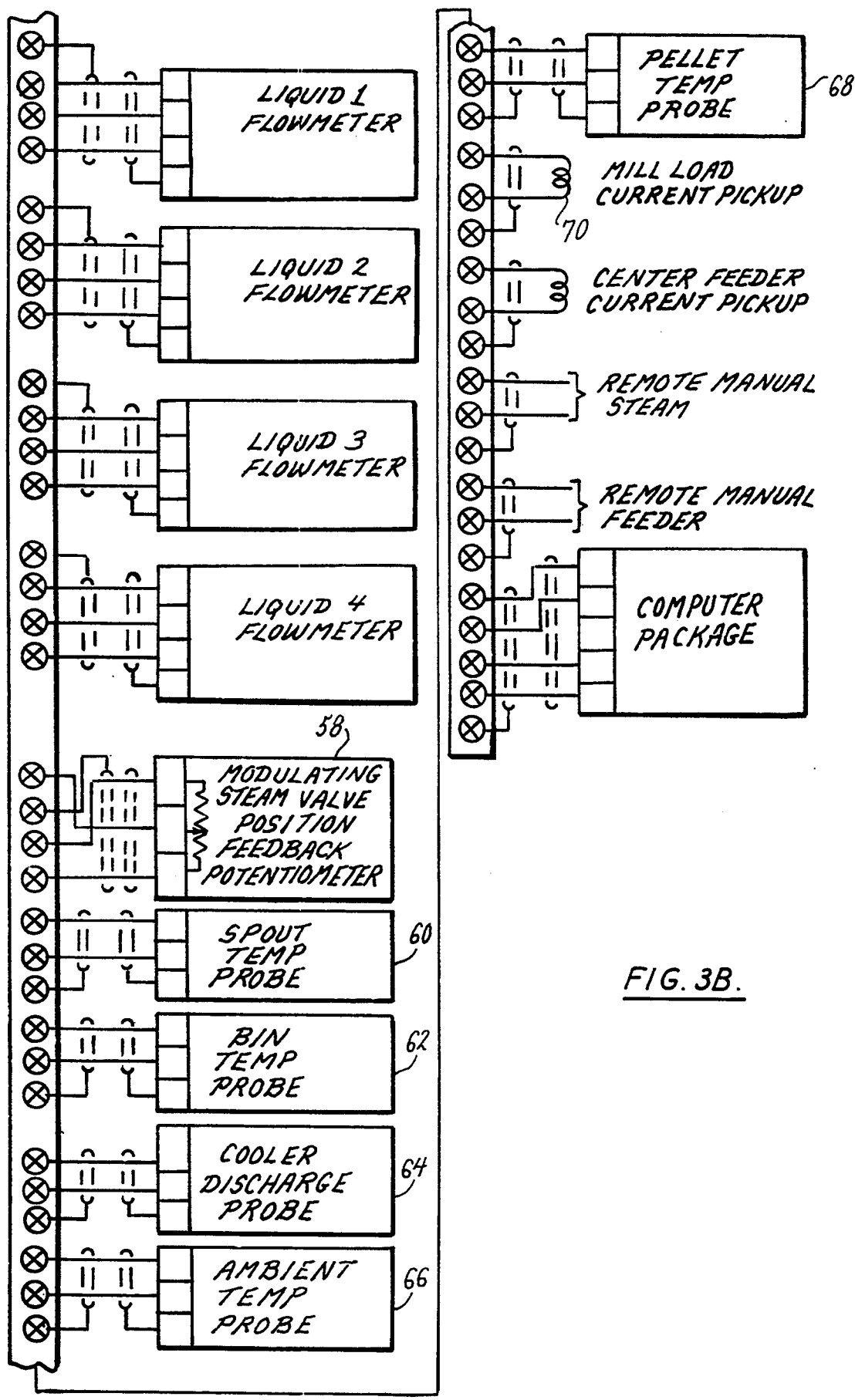

The connections for control 40 are shown in greater in detail in FIGS. 2 and 3 as might be found in a typical pellet mill installation. For purposes of the present invention, it is important to note that the control 40 includes connections 52 to the steam modulating valve 42, connections 54 to the feeder motor 44, connections 56 to the mill motor 38, connections 58 to a modulating steam valve position feedback potentiometer, connections 61 to a feeder variable speed drive, connections 60, 62, 64, 66, 68 to the various temperature probes including an ambient temperature probe, and connections 70 to a mill load current pickup for monitoring mill motor 38 load current. Utilizing these connections, the controller 40 may control the feeder speed and, steam valve position, and monitor an appropriately selected temperature parameter and mill load in order to effectively control the operation of the pellet mill installation 20.

Figure 4A:
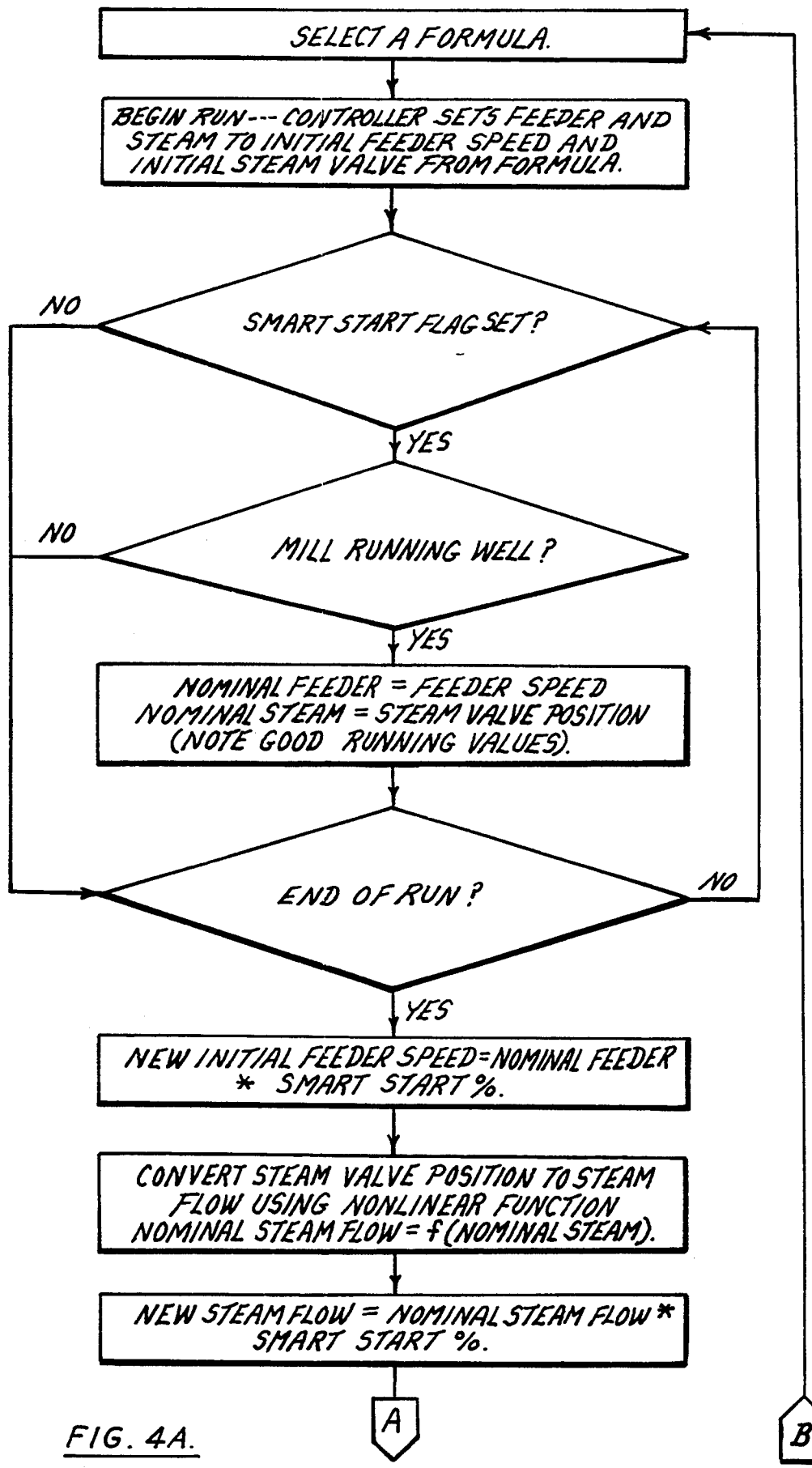
FIGS. 4A-4B are flow charts detailing the software implementing the automatic start and normalizing of the steam valve.
Figure 4B:
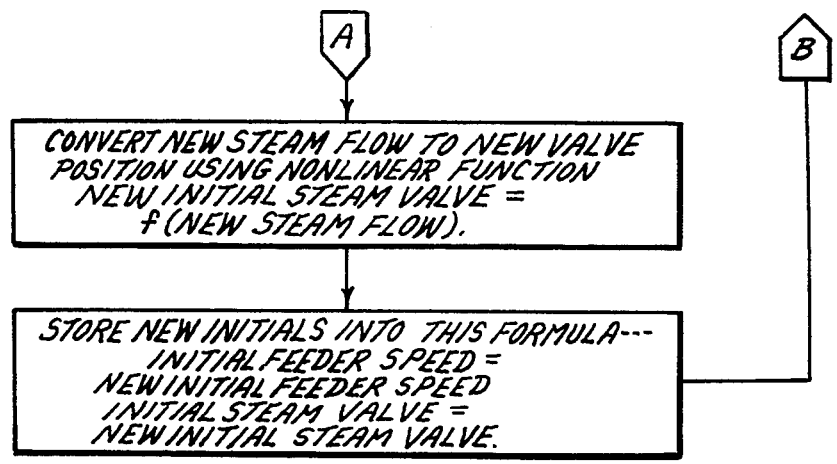
Figure 5:
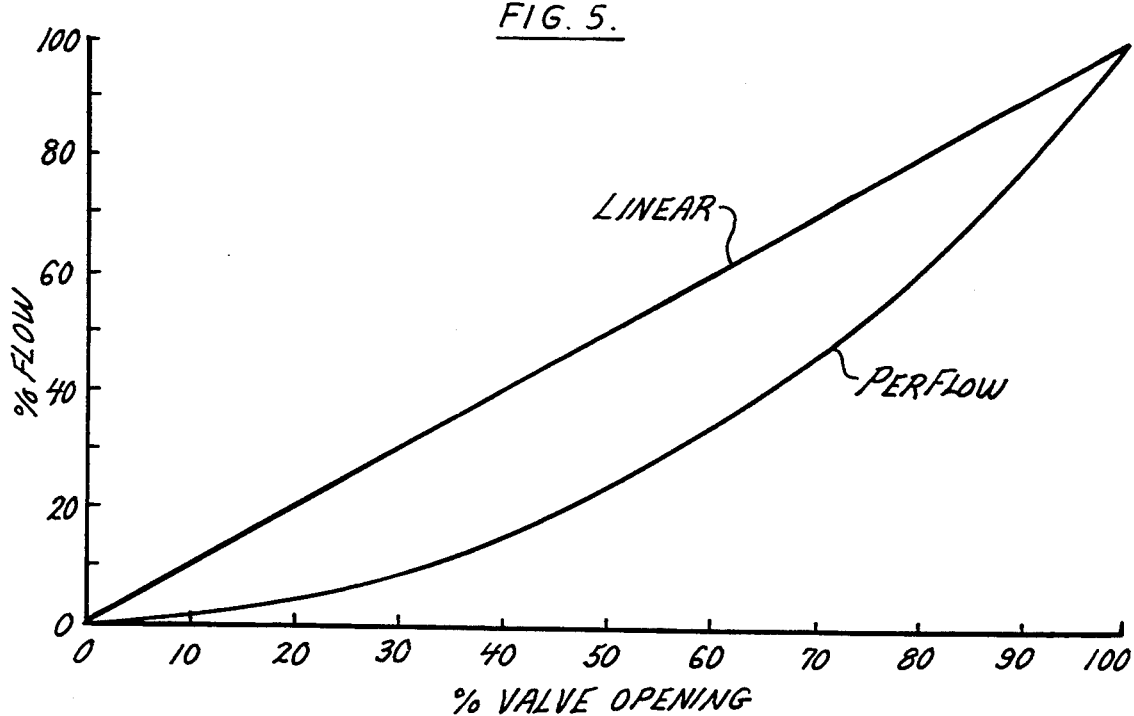
FIG. 5 is a graph detailing the non-linear operation of the steam valve.

As shown in FIG. 4, a flow chart is provided which generally describes the methodology of the present invention for implementing the automatic setting of start points for the steam valve position and feeder speed. Beginning at the top of the flow chart, the controller selects a formula corresponding to instructions given, typically from an operator, for a particular composition of feed pellet. Next, the automatic controller begins the pelleting run by setting the feeder speed and steam valve position to the initial feeder speed and initial steam valve position stored in the controller for starting purposes. The controller next checks to see if the automatic control mode of the present invention has been set. If it has, the controller verifies that the pellet mill is running optimally in accordance with parameters well known in the art and preprogrammed into the computer, including pellet quality, satisfaction of a temperature parameter, and satisfaction of a desired mill load. When the pellet mill is running optimally, the feeder speed and steam valve position are noted as being indicative of a good running condition and stored until the pelleting run has been completed for a particular batch of material. At the end of the run, the stored value indicative of a feeder speed run value is multiplied by a fixed percentage and stored with the formula as the starting feeder speed to be used for the next run made of that particular formula. If the steam valve exhibited a linear relationship between its valve position and the rate of steam flow therethrough, a similar calculation could be made for the steam valve position and its value stored as well. However, for those steam valves customarily used in the prior art, a non-linear relationship is exhibited between the steam valve position and the steam flow, as shown in FIG. 5. Referring briefly to FIG. 5, it is noted that a linear relationship would correspond to the straight line which extends between the origin of the graph and the upper right hand corner wherein 100% steam valve opening would correspond to 100% steam flow therethrough. However, a curvilinear line below the linear projected line has been constructed from measurements made for the steam valve position at various percentages of opening. For example, at approximately 50% valve opening position, the valve lets through approximately 25% of its full rated steam flow instead of the full 50% of steam flow which would be expected with a linear valve. This non-linearity needs to be adjusted for before the new initial steam valve position may be calculated.

Referring now back to the flow chart of FIG. 4, it is noted that the computer would next determine an optimal run steam flow value corresponding to the steam valve position measured at optimal run conditions. This would be determined by referring to a look-up table constructed from the information contained in the chart of FIG. 5, for example. The new starting steam flow value would be determined by multiplying the optimal run steam flow by the same fixed percentage as was used to multiply the feeder speed. The calculated new start-up steam flow would then be reconverted back to a steam valve position using the same information contained in FIG. 5 and its value stored along with the new feeder speed start-up value.

In the preferred embodiment of the present invention, it is anticipated that this methodology would be utilized for every run such that a new set of start-up values would be determined on an on-going basis to adjust for varying conditions in the pellet mill and in ambient conditions as well. However, the controller may disable the recalculation of initial start values upon operator command, as desired. Additionally, the fixed percentage used to calculate initial start values for feeder speed and steam valve position may be adjusted depending upon how aggressive an operator wants to be. For higher percentages, which correspond to a more aggressive attitude, less time would ordinarily be.spent in the start-up phase than if a lower percentage were selected. This percentage may also be adjusted depending upon the particular formula utilized and operator experience. It is well known in the art that some formulations for pellets are "harder starting" than other formulations for pellets. This might provide some reasoning behind changing the fixed percentage utilized from formula to formula.

The present invention may also be utilized to transform the steam valve operation from non-linear to linear during the run operation of the pellet mill controller. This will provide more accurate control of the pelleting process in that a known increase or decrease in steam flow may be made by the controller instead of making a decrease or increase in the steam valve position. This helps prevent overshoot, undershoot, and other control problems which would ordinarily result without this adjustment. Thus, the present invention provides a method for more precisely controlling steam flow through a non-linear valve in a pellet mill or any other non-linear valve in other industrial processes.

There are various changes and modifications which may be made to the invention aswould be apparent to those skilled in the art. However, these changes or modifications are included in the teaching of the disclosure, and it is intended that the invention be limited only by the scope of the claims appended hereto.

What is claimed is:

1. A method for determining an initial steam valve position and an initial feeder speed for starting and bringing a pellet mill up to operating speed comprising the steps of:
   setting an initial steam valve position and an initial feeder speed to an initial value in order to achieve an initial steam flow and an initial flow of feed into the pellet mill;
   increasing the feeder speed until a desired value for a mill load parameter is substantially reached, thereby determining a feeder speed run value, while at the same time increasing the steam valve position until a measured temperature parameter is substantially reached, thereby determining a steam valve run value; and
   calculating a new initial steam valve position and a new initial feeder speed by determining their values corresponding to a fixed percentage of the feed rate and steam flow provided to the pellet mill at their run values so that said new initial steam valve position and said new initial feeder speed provide feed and steam to the pellet mill in the same ratio as provided by said corresponding run values.

2. The method of claim 1 wherein the step of calculating includes the steps of normalizing the steam valve position to correct for any non-linearity in its relationship between steam valve position and steam flow.

3. The method of claim 2 wherein the step of normalizing includes the steps of converting said steam valve run position to a corresponding steam flow, multiplying said corresponding steam flow by said fixed percentage to arrive at a new initial steam flow, and converting said new initial steam flow into a corresponding new initial steam valve position.

4. The method of claim 3 further comprising the step of selecting said fixed percentage according to operator preference.

5. A method for a pellet mill controller to determine an initial steam valve position and an initial feeder speed for starting up a pellet mill comprising the steps of:
   determining a steam valve run position and a feeder run speed based on the valve position and feeder speed measured aS the pellet mill is running as desired, said steam valve.run position and feeder run speed corresponding to a desired steam flow and feed rate; and
   calculating an initial steam valve position and an initial feeder speed by determining their values corresponding to a fixed percentage of the feed rate and steam flow provided to the pellet mill as said pellet mill runs as desired.

6. The method of claim 5 wherein the step of calculating includes the steps of normalizing the steam valve position to correct for any non-linearity in its relationship between steam valve position and steam flow.

7. The method of claim 6 wherein the step of normalizing includes the steps of converting said steam valve run position to a corresponding steam flow, multiplying said corresponding steam flow by said fixed percentage to arrive at a new initial steam flow, and converting said new initial steam flow into a corresponding new initial steam valve position.

8. The method of claim 7 further comprising the step of selecting said fixed percentage according to operator preference.

9. In a pellet mill controller for controlling the input of steam through a steam valve and feed by a feeder into a pellet mill, the improvement comprising:
   means for determining a steam valve run position and a feeder run speed based on the valve position and feeder speed measured as the pellet mill is running as desired, said steam valve position and feeder speed corresponding to a desired steam flow and feed input; and means for calculating an initial steam valve position and an initial feeder speed by determining their values corresponding to a fixed percentage of the feed and steam provided to the pellet mill as said pellet mill runs as desired.

10. The pellet mill controller of claim 9 wherein the determining means includes means for normalizing the steam valve position to correct for any non-linearity in its relationship between steam valve position and steam flow.

11. The pellet mill controller of claim 10 wherein the normalizing means includes:
   means for converting said steam valve run position to a corresponding steam flow;
   means for multiplying said corresponding steam flow by said fixed percentage to arrive at a new initial steam flow; and
   means for converting said new initial steam flow into a corresponding new initial steam valve position.

12. The pellet mill controller of claim 11 wherein the determining means includes means for selecting said fixed percentage according to operator preference.

* * * * *